United States Patent [19]

Wiener

[11] Patent Number: 4,528,779

[45] Date of Patent: Jul. 16, 1985

[54] METHOD OF AND ARRANGEMENT FOR GRINDING OF GEARS

[76] Inventor: Dieter Wiener, Tulpenstr. 9, 7505 Ettlingen 5, Fed. Rep. of Germany

[21] Appl. No.: 443,740

[22] Filed: Nov. 22, 1982

[51] Int. Cl.³ .............................................. B24B 5/00
[52] U.S. Cl. ............................. 51/105 GG; 51/123 G; 51/124 L; 51/267; 51/287; 409/135
[58] Field of Search .................. 51/267, 124 L, 287, 51/105 GG, 123 G, 322; 409/27, 29, 135, 136

[56] References Cited

U.S. PATENT DOCUMENTS

| | | | |
|---|---|---|---|
| 1,524,527 | 1/1925 | Sears | 409/136 |
| 2,620,602 | 12/1952 | Schenk | 51/267 |
| 3,047,987 | 8/1962 | Baldenhofer et al. | 51/267 |
| 3,081,586 | 3/1963 | Gersbach | 125/13 R |
| 3,141,378 | 7/1964 | Rabinow | 409/135 |

Primary Examiner—James L. Jones, Jr.
Attorney, Agent, or Firm—Michael J. Striker

[57] ABSTRACT

A method of and an arrangement for grinding gears, particularly bevel gears, includes grinding in a cooling lubricant bath in the cooling and lubricating medium to provide an increased grinding efficiency and cooler grinding without danger of grinding damage, and also guarantee self-cleaning of the grinding wheel since the cooling lubricant is always available in the grinding point.

4 Claims, 14 Drawing Figures

METHOD OF AND ARRANGEMENT FOR GRINDING OF GEARS

BACKGROUND OF THE INVENTION

The present invention relates to a method of and an arrangement for grinding of gears.

Grinding of gears as a fine-working process after hardening of the workpiece is known. Basically, the grinding is subdivided into grinding processes for spur gears and grinding processes for bevel gears with straight, inclined or spiral and arcuate gears, as disclosed in Höfler, Willi and Wiener, Dieter: "Feinbearbeiten von Zahnrädern durch Zahnflankenschleifen," antriebstechnik 11 (1972) Nr. 3 and 4, pp. 87–90; 113–16 and DE-OS 27 21 164 and 28 34 149.

It is known from the prior art to spray a cooling lubricant onto a working point or location, or in other words in the engaging region between the grinding wheel and the gear to be worked. Since the grinding speed during, for example, bevel gear grinding amounts to approximately 30 m/s, a centrifugal acceleration here is $g = 1800$. This means that during supply of the cooling lubricant under high pressure, it does not reach the grinding points, but instead is flung back. As a result of this, a specifically small grinding efficiency could take place, which is smaller than $$a' = 2 \frac{mm^3}{mm\ sec}.$$

In addition, there is also a danger of grinding damage, for example by grinding burning.

SUMMARY OF THE INVENTION

Accordingly, it is an object of the present invention to provide a method of and an arrangement for grinding of gears, which avoids the disadvantages of the prior art.

More particularly, it is an object of the present invention to provide a method of and an arrangement for grinding of gears which has an increased grinding efficiency.

It is also an object of the present invention to provide a method of and an arrangement for grinding of gears which, with the above mentioned advantageous results, can be used for all tooth flank grinding processes and are especially advantageous for grinding bevel gears, both with straight and inclined teeth, and also with spiral or arcuate teeth, as disclosed, for example, in the German Offenlegungsschrift 2,721,164.

It is a further object of the present invention to provide an arrangement for grinding of gears which has a simple construction, does not require re-design of available tooth flank grinding machines and allows to easily equip the available tooth flank grinding machines with the inventive arrangement.

Finally, it is an object of the present invention to provide an arrangement for grinding of gears in which the protection of electrical or electronic structural elements, hoses and couplings against the utilized cooling lubricant must not be increased.

In keeping with these objects, and with others which will become more apparent hereinafter, one feature of the present invention resides, briefly stated, in a method of grinding of gears in a grinding machine in accordance with which a bath of a cooling lubricant is formed so that grinding is constantly performed in the cooling lubricant bath inside the cooling lubricant.

When the method is performed in accordance with the present invention, the working process or grinding takes place in the cooling lubricant bath, or in other words under the cooling lubricant. Because of this the cooling lubricant is no longer flung back from the working point. As a result of this, because of cooler grinding, a considerable increase in grinding efficiency takes place without the danger of grinding damage. Particularly in the event of grinding of bevel gears, but also in other grinding processes, an increase of the grinding efficiency amounts to at least 100%, as compared with conventional methods.

During grinding in the oil bath, no oil cloud can be generated on the grinding wheel, as takes place in wet grinding. When the wheel is completely immersed into oil, the contamination of the surrounding atmosphere is considerably reduced. The grinding oil drops only in such a manner which takes place during milling with small cutting speeds. In some cases a covering with aspiration can be dispensed with, which is now incompatible on the grounds of maintenance of the air cleanliness. Thereby the accessibility to the grinding chamber is considerably increased and the inspectability in the working chamber is improved. Operation inside the covering, which is required during workpiece exchange, poses considerable problems to the operators, inasmuch as oil constantly drops in the working chamber even when good aspiration is used.

By encapsulation of the working chamber directly around the grinding wheel and gear to be worked, the safety during grinding is considerably increased. In the event of breakage of the grinding wheel, no fragments can leave the immediate working chamber, so that no injury danger for the personnel takes place. With such a safety arrangement it is possible to carry out high-speed grinding. Altogether, the increase of the cutting speed results in a higher material removal speed, an improved quality of the outer surface, and an increase of the service life of the grinding wheel. Because of the increased service life of the grinding wheel, longer dressing cycles are possible, so that the service life of the dressing tool relative to the number of dressed grinding tools is improved.

Because of the grinding in the oil bath, the expensive high-pressure cleaning, which requires cooling lubricant pumps for a higher pressure, can be dispensed with. This results in an power economy. An expensive nozzle device with matching to the geometry of the grinding wheel is also not necessary. Moreover, a resetting of the high-pressure nozzle with decreasing diameter of the grinding wheel can be dispensed with.

Since the grinding tool, for example a grinding wheel, is arranged in the oil bath a self-cleaning of the grinding tool connected with the above described higher machining efficiency takes place. Despite greater machining efficiency, the grinding tool is no longer clogged or is not clogged so fast.

Because of the greater feeding speed, an acceleration of the working cycle takes place with improved tooth quality.

In accordance with another feature of the present invention, in the inventive method the cooling lubricant is constantly supplied to the cooling lubricant bath, and the same quantity of cooling lubricant is withdrawn from the latter. Because of this, an optimal cooling and lubricating action is provided.

Another feature of the present invention is that the cooling lubricant is supplied to the cooling lubricant bath in a circulating process. As a result of this, the cooling medium after passing a band filter device is again pumped back into the cooling lubricant bath.

Still another feature of the present invention is that, in accordance with the inventive method, the cooling medium is intermediately cooled and/or cleaned. When the method is performed in accordance with these features, the gear to be worked and the grinding tool run in an optimal tempered and cleaned cooling lubricant bath.

Yet another feature of the present invention is that in accordance with the inventive method the cooling lubricant is supplied under the grinding point into the cooling lubricant bath. Since the cooling lubricant is supplied beneath the grinding location, depositing in the cooling lubricant bath is prevented. Moreover, metal particles are continuously transported from the cooling medium bath which constitutes an improvement of the quality of the tooth flanks.

A further feature of the present invention is an arrangement for grinding of gears which has a cooling lubricant chamber accommodating a cooling lubricant bath and arranged so that at least a circumferential part of a grinding wheel in contact with a tooth to be worked, and at least the tooth to be worked, are located in the chamber, wherein the chamber allows all working movements of the gear and the grinding tool and also insertion and withdrawal of the gear and the grinding tool.

When the arrangement is designed in accordance with these features, it makes possible to use simple means for arranging the gear to be worked and the grinding tool inside the cooling lubricant bath so as to provide for highly advantageous results of the invention. The arrangement can be subsequently installed on already utilized gear grinding machines by arranging respective walls of the cooling lubricant bath so that the gear to be worked and the grinding tool are continuously immersed in the bath. Re-designing of the gear grinding machine itself, for example a grinding machine for grinding bevel gears, has not to be made. Various movements which are carried out during working of tooth flanks in conventional grinding machines, such as for example the machine described in German Offenlegungsschrift 2,721,164, are not affected in any way, inasmuch as the walls of the arrangement, which surround the cooling lubricant bath, can be arranged and/or formed so that they follow and/or align with the various cutting, rotary, auxiliary and feeding movements. For example, the walls can be respectively deformable, spatially hinged and/or elastic or flexible.

Since the chamber which surrounds the gear to be worked and the grinding tool is small as compared with the entire gear grinding machine, it is not necessary to increase the conventionally used band filter devices, inasmuch as the entire available quantity of cooling lubricant need not be increased. From the quantity of the cooling lubricant located in the band filter device, a somewhat greater quantity is maintained ready on the respective gear grinding machine in the cooling lubricant bath, so that on economical grounds no disadvantages arise from the utilization of the invention.

Still a further feature of the inventive arrangement is that the cooling lubricant chamber is formed position-variable and/or volume-variable. When the cooling lubricant chamber is formed in accordance with these features, it can follow the working processes, for example during grinding of bevel gears as disclosed in German Offenlegungsschrift 2,721,164, on the one hand. On the other hand, it is for example also possible to change the volume of the cooling lubricant bath in correspondence with the dimension of the gear to be worked and/or of the grinding tool or in correspondence with the differing pitch cone angle.

The cooling lubricant chamber can be provided with one or more closable openings. These openings make possible handling of the gear to be worked and/or the grinding tool.

Still a further feature of the present invention is that the walls of the cooling lubricant chamber are provided with at least substantially closable through openings for the gear and/or the tool. Thus, the gear and the tool can be inserted directly through the walls of the cooling medium bath and subsequently these openings are closed in the required degree in a cooling lubricant-tight manner. As a rule, an absolute tightness is not necessary, since normally all tooth flank grinding machines are provided with a discharge for the cooling lubricant. It suffices as a rule to provide the required through openings with gap seals at which the cooling lubricant exits in a small quantity, for example by flowing over. It is important that the cooling lubricant bath is continuously replenished by a sufficient quantity of the cooling lubricant.

The cooling lubricant chamber can be provided in its lower part with a pump conduit for supplying the cooling lubricant, whereas the lower part of the cooling lubricant chamber can be provided with a discharge for the cooling lubricant. As a result of this, practically no deposits of sinking material in the cooling lubricant chamber takes place. Because of the connection of the pump conduit at the lower part of the cooling medium chamber, the removed metal particles are continuously held on float and flow together with the withdrawn cooling lubricant to the filter. It is to be understood that it is also possible to supply the cooling lubricant from above and to discharge it so that no dead spaces develop. It is important that the arrangement of the supply relative to the discharge must be formed so that the chamber is sufficiently flown through, and thereby no heated quantities of oil remain in the working region.

Still a further feature of the present invention is that the walls of the cooling lubricant chamber completely embrace the gear to be worked and the grinding tool. These features are suitable, for example, for grinding of bevel gears with spiral or arcuate teeth, for example by rolling grinding with an inclined workpiece in accordance with the "tilt" process for a pinion, so that the respective cup-shaped gear is produced by immersion grinding. In the same manner, the cooling lubricant chamber can be formed for the immersion grinding (shape grinding), so that only cup-shaped wheel is produced, whereas the pinion is produced in accordance with the "Tilt" process.

In this embodiment, the cooling lubricant bath can be arranged around the gear and workpiece when in the arrangement gear pair for bevel gears with spiral or arcuate teeth must be produced with a cup-shaped grinding wheel arranged on a rotary spindle with two grinding flanks forming one cone, and with at least one shaft guiding the bevel gear in a rolling movement (an oscillating rotary movement). At least the teeth of one bevel gear of the gear pair are produced in one working step by grinding of tooth flanks located at both sides of a tooth gap, and at least the grinding wheel which produces the teeth of the counter gear is driven about an axis in an additional cyclical movement with a small eccentricity. Such an embodiment is disclosed and illustrated in German Offenlegungsschrift 2,721,164. The above mentioned cyclical movement can be a circular movement. The cyclical movement can also be carried by two circular arcs which are convex relative to the curvature of the tooth flanks and have different curvatures. Moreover, it is possible to provide between both arcuate movement portions a rectilinear movement portion substantially normal to the tooth flanks. Both circular arcuate movement portions can have different centers of rotation. Moreover, the grinding wheel can be replaceable in direction of its axis. The cutting and feeding movement of the grinding wheel can also be performed counter to one another.

The walls of the cooling lubricant chamber can be formed flexible. This allows especially during grinding of bevel gears with spiral or arcuate teeth to compensate the required movements of the gear and the tool in a simple manner.

Another feature of the inventive arrangement is that the cooling lubricant chamber can be formed as a bellows, a flexible tube, or a flexible bag. Thus, the cooling lubricant chamber can have several simple constructions. In accordance with this embodiment, the cooling lubricant bath can be arranged without difficulties around the gear and the tool so that the cooling medium can lie at least at the working point. As a rule the gear and the tool are so surrounded by the cooling medium bath that they are located completely in the latter.

Since during tooth flank grinding, especially in the event of grinding of bevel gears with spiral or arcuate teeth, different relative movements of the gear or the tool take place, measures must be taken to prevent the tool from contacting with the walls of the cooling lubricant bath, particularly when these walls are flexible, for example formed as a bellows. Maintenance of the required distance to the movable gear or the tool can be carried out in simple manner by respective spacers in form of angle iron and/or spiral springs. These elements impart to the flexible walls a certain inherent and shape stability, so that they do not deflect in undesirable manner under the action of the static pressure of the cooling lubricant so as to come into contact with the respective parts of the machine.

Still another feature of the inventive arrangement is that the cooling medium chamber is formed so that it is telescopably displaceable in a longitudinal direction. In such an arrangement, with simple means two tubular parts inserted in one another form the walls of the cooling lubricant bath. One telescopable part is arranged in the region of the gear spindle or the like, whereas the other telescopable part is arranged at its end opposite to the gear in the region of the grinding tool spindle or grinding tool holder.

For the purpose of inserting and withdrawing the gear and/or the grinding tool, the cooling lubricant chamber can be formed divisible and turnable. By this simple means, the cooling lubricant chamber can be extended so as to make possible insertion or withdrawal of the gear and the tool.

In accordance with another embodiment of the present invention, the cooling medium chamber can be sealed relative to the gear spindle at one end, and relative to the tool spindle, on the other hand, by a gap seal in a liquid-tight or approximately liquid-tight manner.

Still a further embodiment of the inventive arrangement is that the inner wall of the cooling lubricant chamber is held at an adjustable distance from the gear and the tool, for example by a spiral member or a reinforcing member.

The entire cooling lubricant chamber or its wall portions can be formed, for the purpose of adjustment to different pitch cone angles, turnable and arrestable or deformable, for example flexible. These features are specially advantageous for grinding of bevel gears. The flexible or deformable wall portions can be adapted to all adjusting, working or feeding movements to the required degree. In a simple manner, a correspondingly dimensioned web of a material resistant to the cooling lubricant, for example a suitable elastomeric material, can be used for making such wall portions. The respective web is tubularly assembled and mounted, for example, by a respective wire or profile frame immovably arranged on the tool holder, for example by a clamp strap with a toggle joint or a suitable quick closure. The web, on the other hand, is also arranged in the respective manner via suitable wire or iron holders immovably mounted on the tool holder, similarly by a clamp strap and advantageously also with a suitable quick closure, such as a toggle joint closure. As a result of this, a bag-shaped structure is produced which forms a container for the cooling lubricant bath. The excessive cooling lubricant runs in a simple manner above from the cooling lubricant bath, whereas cleaned and/or intermediately cooled cooling lubricant is pumped at the side of the chamber via a pump conduit. When it is necessary to exchange the gear or the tool, the quick closure is released at one end so that the flexible web can be removed. The cooling lubricant flows then downwardly into the machine sump from which it is pumped back in a conventional manner for cleaning and/or intermediate cooling. After the gear or tool exchange, the flexible web can be again arranged without problems, with little manipulations, so that the thus formed bag-shaped chamber can again be filled with the cooling lubricant in which the gear and the tool, for example a grinding wheel immerse. For preventing strikes of the gear or the tool against the flexible web, the web can be retained in a suitable manner by spreading arm mounted on the machine at its side at a distance from the gear or the tool. With these arms, a turnable and/or deformable structure can take place which allows respective deformation of the web for the respective application purposes.

A further feature of the present invention is that the cooling lubricant container can be composed of two tubular housing parts which are sealed by gap seals and can be arrested in differing drawing-out positions and/or in different turning positions corresponding to the desired pitch cone angle. These features provide for a simple construction of the container including only two tubular parts sealed by a gap seal. The gap seal is not absolutely necessary, inamuch as the exit of the cooling lubricant can be taken into account. The exiting cooling lubricant runs, as described above, into the machine sump and is pumped back from there.

The housing of the cooling lubricant bath, in accordance with further features of the invention, has an arcuately curved wall part, a turnable pipe turnable inside the wall part about an axis normal to the tool axis coaxially with the gear axis and having a collar-shaped projection which forms together with the wall part a gap seal, a telescopable part having one end longitudinally movable in the turnable pipe with a gap seal, a guiding pipe extending coaxially to the gear axis and arranged so that another end of the telescopable pipe is located in the guiding pipe within the position of a gap seal and the guiding pipe has a flange releasably connected with a stationary machine part, an annular disk extending normal to the tool spindle and provided with a bearing for the axis of turning of the turnable pipe and a central opening through which the gear and the tool can be brought into contact with one another, a bearing pipe arranged to surround the tool with a relatively great radial distance, and an end cover closing the bearing pipe in the region of the rear side of the tool and in the region of the tooth spindle and sealed by a gap seal relative to the latter.

In the arrangement formed in accordance with these features, the pitch cone angle can be adjusted by corresponding turning of one of the parts. It is possible to provide a respective volume chamber of the cooling lubricant bath so that the container can be adjusted to all requirements, particularly all movements and adjustment operations which take place, for example, during grinding of bevel gears, particularly during grinding of bevel gears with spiral or arcuate teeth. The housing parts are sealed via gap seals relative to the machine. The grinding oil thereby does not act upon the seals of the tool spindle or the gear spindle, but instead runs pressureless in the machine sump.

Still a further feature of the present invention is that the cooling lubricant bath is accommodated in a substantially funnel-shaped housing with a cylindrical housing part which is sealed by a gap seal either at the end side of the machine housing opposite to the grinding tool or at its peripheral surface, and releasably connected by quick closure, particularly clamped or screwed. In such a construction the turning axle required in the preceding embodiments can be dispensed with, since the sealing face of the cooling lubricant bath is located directly in the region of the tool holder or the tool face.

The housing of the cooling lubricant chamber can be provided with several adjustment elements distributed over the circumference and formed, forexample, as cylinder-and-piston units operated by a pressure medium or as spring elements.

A further feature of the present invention is that the housing of the cooling lubricant bath is composed of two housing parts which are movable in a spatially hinged manner relative to one another and arrestable in the respective positions. With the arrangement designed in accordance with these features, the cooling lubricant chamber can be adapted to all conditions spatially in a particularly simple manner. This can be attained by provision of a spherical joint or respective flexible design of the housing parts or one part.

The cooling lubricant chamber can be formed as a bellows or bag mounted by a quick closure in the region of the wheel spindle and on the gear holder. This construction has particular advantages for grinding bevel gears, for example during grinding of bevel gears with spiral or arcuate teeth.

The cooling lubricant chamber can have a cup-shaped container closed by a cover sealed relative to the tool spindle by a gap seal and having a substantially diagonal corner region through which the gear with the gear spindle extends and sealed relative to a machine housing or the gear spindle. This embodiment is advantageous for utilization during rolling grinding with inclined workpiece.

The cooling lubricant chamber can be formed as an upwardly open container which during grinding is fully filled with the cooling lubricant so that the latter flows over an upper edge of the container, and the container has a corner region through which the tool with the tool holder extends into the container and in which a gap seal is arranged. This is a different embodiment of the invention.

During rolling grinding with inclined grinding head, the so-called "Tilt" process for a pinion, the gear with horizontally extending axis of rotation extends into a cup-shaped container, whereas the grinding tool with its spindle is arranged with a substantially diagonal axis of rotation in the container, and the container is sealed on the one hand by a cover for example via a gap seal at least relative to the tool spindle, and this container is constantly filled with the cooling lubricant during the grinding process. This construction is particularly suitable for the rolling grinding with inclined head (so-called "Tilt" process for pinions, wherein the respective cup-shaped gear is produced by immersion grinding).

For immersion grinding (shape grinding) without rolling, the grinding tool with a vertical axis of rotation extends into a container closed by a cover, whereas the gear formed as a cup-shaped gear with an inclined axis of rotation is arranged in the container, wherein the cover is sealed relative to its walls by a gap seal and also relative to the tool spindle by a gap seal, and the container bottom is sealed by a gap seal relative to the gear holder. This construction has the advantages during immersion grinding (shape grinding) of the bevel gears.

For shape grinding of the cylindrical gears, the gear and the grinding tool are arranged in housing parts which are movable relative to one another by play-compensating elements, particularly spring elements or adjusting pistons, and communicate with one another in a liquid-conducting manner, whereas one housing part is sealed relative to the axle of the gear and the dressing tool, at least by gap seals. In this construction, only small quantities of oil have to oscillate. By elastic covering and the spring device, not only the grinding wheel wear is compensated, which is not relevant in the event of bevel gear grinding, but also first of all the oil chamber remains closed when the grinding wheel runs partially back. During bevel gear grinding and during grinding in accordance with the Niles/Höfler process, the grinding wheel is partially withdrawn. During the grinding of spur gears, the compensation of the grinding wheel wear is particularly important. The advantage in grinding of bevel gears is limited since in some cases the dressing of the grinding wheel takes place via the grinding tool spindle; then the compensation can be carried out by the seal between the tool spindle rear and the housing.

Still a further feature of the present invention is that, for continuous rolling grinding of spur gears (cylindrical gears), the gear and the grinding tool are arranged in separate housing parts connected with one another in a liquid-conducting connection. This arrangement can be used with advantage during the Reishauser process, in other words during continuous rolling grinding of spur gears (cylindrical gears).

For performing the Niles/Höfler process (partial rolling grinding of spur gears - cylindrical gears), the gear and the tool may be arranged in housing parts which are adjustable by play-compensating means and connected with one another in a cooling lubricant-conducting manner.

Another feature of the present invention is that the arrangement can be provided with two flat faces which are pressed against one another and overlapped so that during the entire working process no cooling lubricant can escape. The oil discharge can take place over the cooling lubricant chamber via an overflow container. During dressing of the tool, changes of the axes distance take place. When the arrangement is designed in accordance with the above mentioned features, these changes are compensated in advantageous manner. These features can be used in all preceding embodiments. With the overlapping of the contact faces of the housing parts, which are connected at their one side with the tool holder and at their other side with the gear holder, it is guaranteed that in each working position the cooling lubricant chamber is sufficiently sealed. With the above described discharge of the cooling medium, it is guaranteed that in the event of fast oscillation movement sufficient quantities of the cooling lubricant are available in the cooling lubricant chamber.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
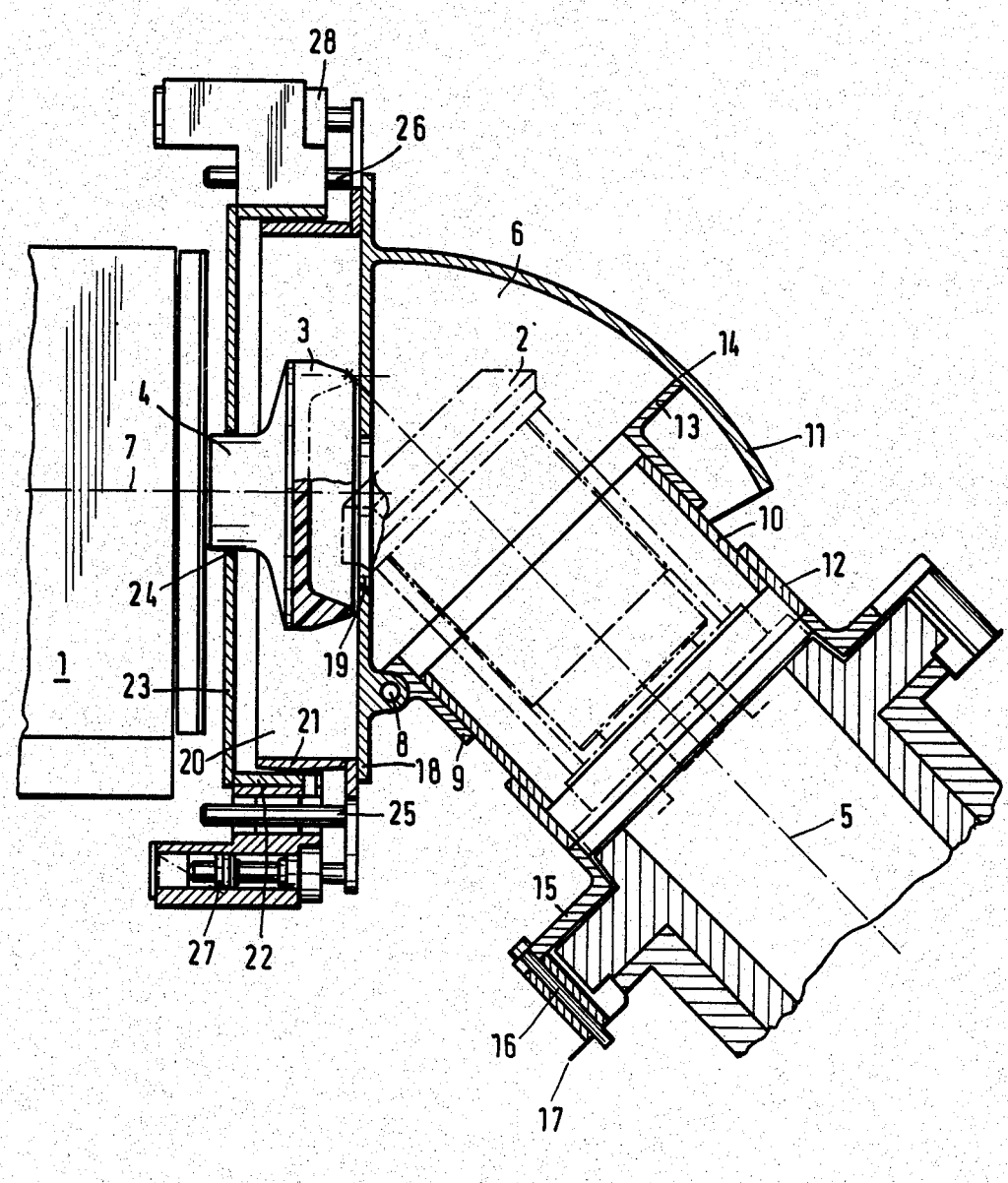
FIG. 1 is a partially sectioned plan view of the gear grinding machine for grinding bevel gears.

In the embodiment shown in FIG. 1, reference numeral 1 identifies a tooth-flank grinding machine for a bevel gear 2 which substantially corresponds to prior art, and therefore its construction and operation is not described in detail. The tooth-flank grinding machine 1 is used in this embodiment for grinding a pair of bevel gears 2 with spiral or curved teeth. The machine has a tool 3 which is arranged on a rotatable motor-driven spindle 4 and is cup-shaped so as to be formed as a grinding wheel. The tool 3 has two grinding flanks forming a cone. It is also provided with a shaft which guides at least one gear in a rolling movement or an oscillating rotary movement. At least the teeth of one gear of the gear pair are produced in a working step by grinding of tooth flanks lying at both sides of a teeth gap. The grinding wheel 3 producing the teeth of the bevel gear can be additionally driven about its axis in an additional cyclical movement of a small eccentricity, as disclosed for example in the DE-OS No. 2,721,164. The axis of rotation is identified in FIG. 1 with reference numeral 5.

As can be clearly seen from FIG. 1, the bevel gear 2 and the tool 3 are located in a chamber 6. The chamber 6 is formed by a turnable pipe 9, a telescopable pipe 10, a curved pipe 11, and a guiding pipe 12. The turnable pipe 9 is turnable about an axis 8 extending normal to the axis of rotation 7 of the spindle 4, by a desired pitch cone angle and arrestable in the respective position. The turnable pipe 9 has a flange 13 which is guided on the inner side of the curved pipe 11 in a turning and sealing manner. It suffices to provide in a region 14, as a rule, a gap seal which must not necessarily be tight to cooling lubricant, inasmuch as the cooling lubricant flowing out here can drop downwardly into a machine sump. It is to be understood that it is, however, possible to provide a suitable seal, for example a lip seal, or another suitable seal, which prevents flowing out of the cooling lubricant.

The telescopable pipe 10 is guided with its one end in a tubular portion of the turnable pipe 9 in a longitudinally displaceable and sealing member. It also suffices here to provide a sliding fit, inasmuch as in practice it is not necessary to have an absolute tightness. It is to be understood that here also suitable seals can be provided to prevent flowing out of the cooling lubricant.

The other end of the telescopable pipe 10 is guided in a tubular portion of the guiding pipe 12 in a longitudinally displaceable and sealing manner. The considerations involved in this guidance are similar to those pertaining to the guidance of the first mentiohed end of the telscopable pipe 10 in the tubular portion of the turnable pipe 9.

The guiding pipe 12 has a flange 15 which is releasably connected by several screws 16 distributed in a circumferential direction, with a non-rotatable part 17 of a support for the bevel gear 2. In this region it is also not necessary to provide absolutely reliable tightness against the cooling lubricant; however, it is also not excluded that suitable known seals can completely eliminate flowing out of the cooling lubricant.

The curved pipe 11 is connected at its ends facing away from the telescopable pipe 10 with an annular disk 18 of one piece with the latter. The annular disk 18 has an opening 19 for passage of a peripheral portion of the gear 2 into an auxiliary chamber 20 communicating with the above mentioned chamber 6. The bevel gear 2 extends into the auxiliary chamber 20 so that the tool 3, the grinding wheel, can come into a working contact with the tooth flanks to be worked.

The auxiliary chamber 20 is bounded substantially by a bearing pipe 21 and a guiding pipe 22 with an end cover 23. The end cover 23 has a central opening 24 for passage of the spindle 4 for the tool 3. In the region of the interengaging parts and also in the region of the opening 26, gap seals are provided which do not necessarily prevent the exit of a certain quantity of the cooling lubricant, inasmuch as the cooling lubricant flowing out here drops downwardly into the machine sump and is pumped from there.

Figure 2:
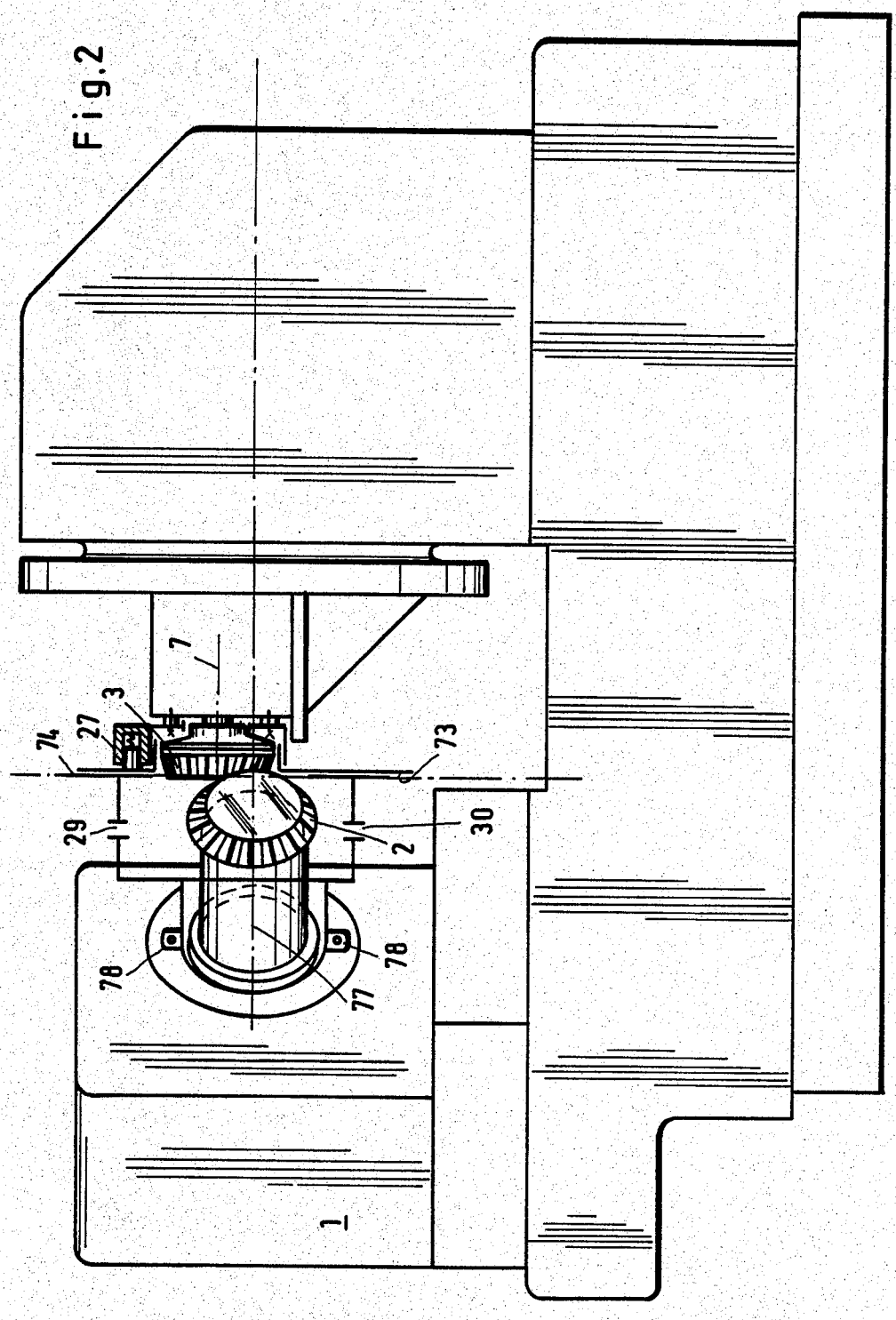
FIG. 2 is a partially sectioned side view of the gear grinding machine of FIG. 1.

As can be clearly seen from FIG. 1, the bevel gear 2 and the tool 3 are arranged together in a chamber which is substantially closed outwardly. This common chamber 6, 20 is maintained during grinding of the bevel gear 2, constantly filled with the cooling lubricant so that the tool 3 works in a cooling lubricant bath, or under the upper surface of the bath of the cooling lubricant. For this purpose, a pump conduit 30 opens in the lower part of the chamber 6, 20, as can be seen in FIG. 2. A certain quantity of the cooling lubricant is constantly pumped via the pump conduit 30. This quantity replaces a cooling lubricant quantity flowing out at the gap seals, on the one hand, and constantly reuse a cooling lubricant quantity flowing out in the upper region of the cooling lubricant chamber. This constantly pumped quantity of cooling lubricant can be pumped by a conventional device which is not shown in the drawing and has a filter for cleaning and/or intermediately cooling the cooling lubricant. Reference numeral 29 identifies a discharge for the cooling lubricant.

Guiding pins 25 and 26 are identified with reference numerals 25 and 26 which provide for axial adjustment and guarantee axial and radial guidance of the guiding pipe 22 and parts connected therewith. This axial adjustment can be provided by several cylinder-and-piston units, so-called adjustment cylinder-and-piston units, which are distributed in a circumferential direction, preferably uniformly, and operate alternately at both sides under the action of the pressure of a pressure medium, particularly a hydraulic oil. The adjustment cylinder-and-piston units are identified with reference numerals 27 and 28. It is thereby possible to compensate and adjust in an optimum manner changing axial play between the bevel gear 2 and the tool 3 in the event of sharpening of the grinding wheel 3.

As can be clearly recognized from FIG. 1, a conventional tooth-flank grinding machine is not completely re-designed. To the contrary, already built and used machines which are in operation can be equipped in a simple manner with parts shown in FIG. 1 in accordance with the present invention, so that all the advantages of the invention are achieved in desirable and effective manner. The cooling lubricant chamber is arranged around the parts which are in working contact with one another, in other words the tool and the gear, in such a manner that susceptible parts, for example electronic or electrical parts, conduits, control conduits, hoses, etc., are not in contact with the cooling lubricant bath and no longer covered with the cooling medium as is known in grinding machines of this art.

The walls of the chamber 6, 20 are composed in the embodiment shown in FIGS. 1 and 2 of steel. It is to be understood that they can also be composed of aluminum alloys or other materials. It is also possible to produce these parts, for example, by molding or injection molding of a suitable synthetic plastic material.

Figure 3:
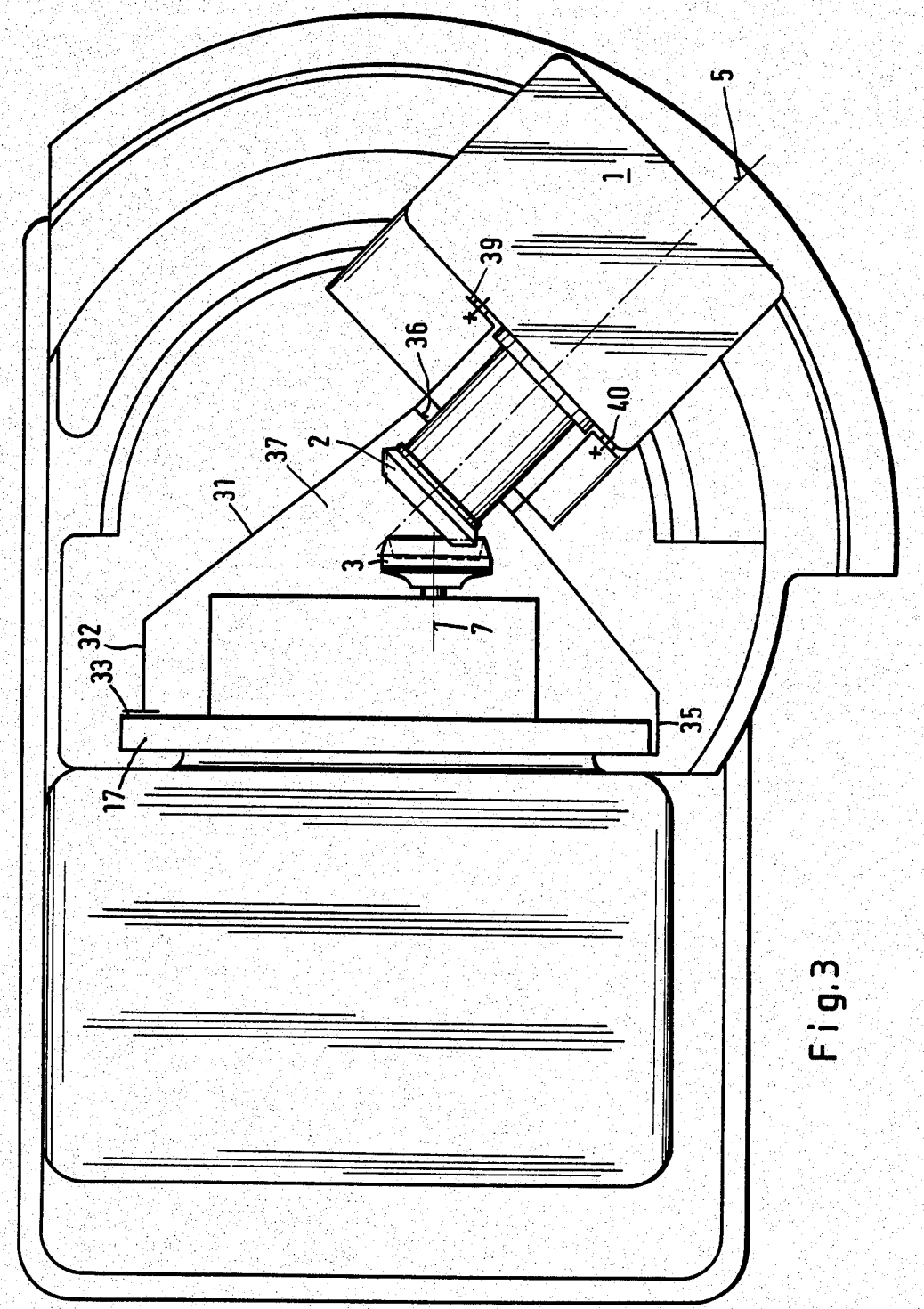
FIG. 3 is a partially sectioned plan view of the gear grinding machine in accordance with another embodiment.
Figure 4:
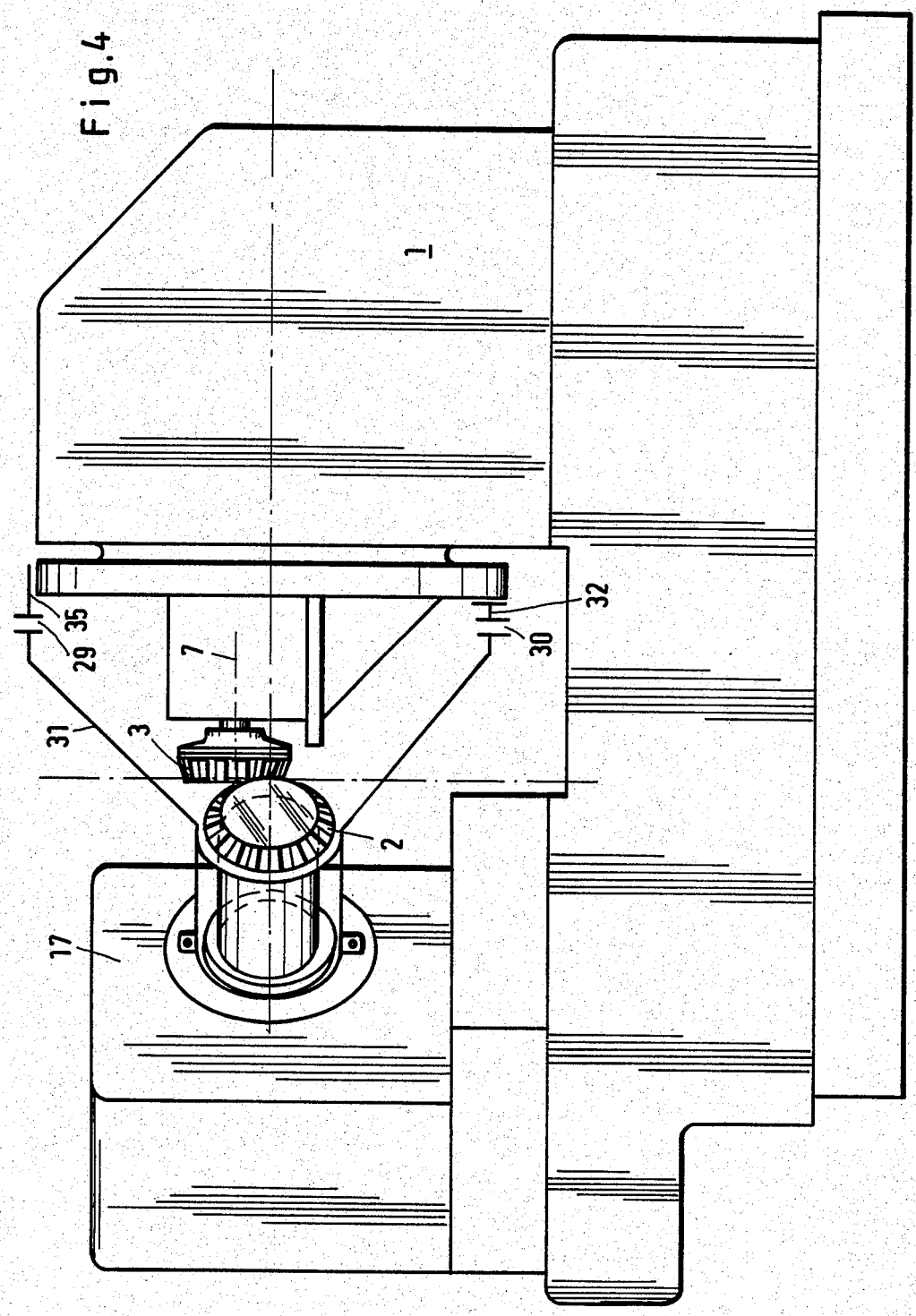
FIG. 4 is a partially sectioned side view of the gear grinding machine of FIG. 3.

In the embodiment shown in FIGS. 3 and 4, parts which perform the same functions are identified with the same reference numerals as in the previous embodiment. The embodiment shown in FIGS. 3 and 4 differs from the above described embodiments substantially in the fact that a cooling lubricant chamber around the gear 2 to be worked and the tool 3, particularly a grinding wheel, is formed by a substantially funnel-shaped housing 31. The housing 31 has a cylindrical part 32 with which the housing is releasably mounted on the stationary part 17 of the machine, preferably with interposition of a gap seal 33, for example by screws. This is shown in an upper part of FIG. 3 and a lower part of FIG. 4. The lower part of FIG. 3 shows that, instead of this, the cylindrical part 32 engages around the part 17 and can be releasably mounted by a clamp strap with a snap closure similar to a toggle joint. This region is identified with reference numeral 35. Reference numeral 34 identifies a gap seal. In this region as well as in the region of the gap seal 33 it is not necessary to provide absolutely tightness, inasmuch as a relatively small quantity of cooling lubricant flowing out here can drop or discharge outwardly, wherein it can be pumped back via the machine sump to a not shown band filter device.

The housing 31 is provided at its end opposite to the cylindrical part 32 with an annular collar 36. The collar 36 engages behind the gear 2 and at least substantially seals a cooling lubricant chamber 37 in the region of the spindle by a gap seal. As described above, the gap seal can be formed here as the gap seal 33, or the gap seal 34 in the region 35. It is to be understood that all gap seals can be additionally sealed outwardly by additional sealing elements in a fluid-tight manner, so that practically no cooling lubricant can flow out from the cooling lubricant chamber 37.

A cylindrical tubular housing part 38 is formed of one piece with the collar 36. The housing part 38 is connected with its flange 39 and a plurality of mounting screws 40 distributed over a circumference with a stationary part of the machine.

The funnel-shaped housing 31, its cylindrical part 32, the collar 36, and the housing part 38 can be composed of a sheet metal or another suitable material, for example a resistant synthetic plastic material.

This embodiment also has suitable adjusting elements, for example an adjusting cylinder-and-piston unit similar to that of FIG. 1 and 2, so that the axial play after sharpening of the tool 3 can be correspondingly adjusted. For this purpose, it is possible to utilize the adjusting cylinder-and-piston unit operating by the pressure of a pressure medium alternating at both sides, similarly to the embodiment of FIGS. 1 and 2. It is also possible to use spring elements which compensate changing axial play automatically and/or in a predetermined mode.

Figure 5:
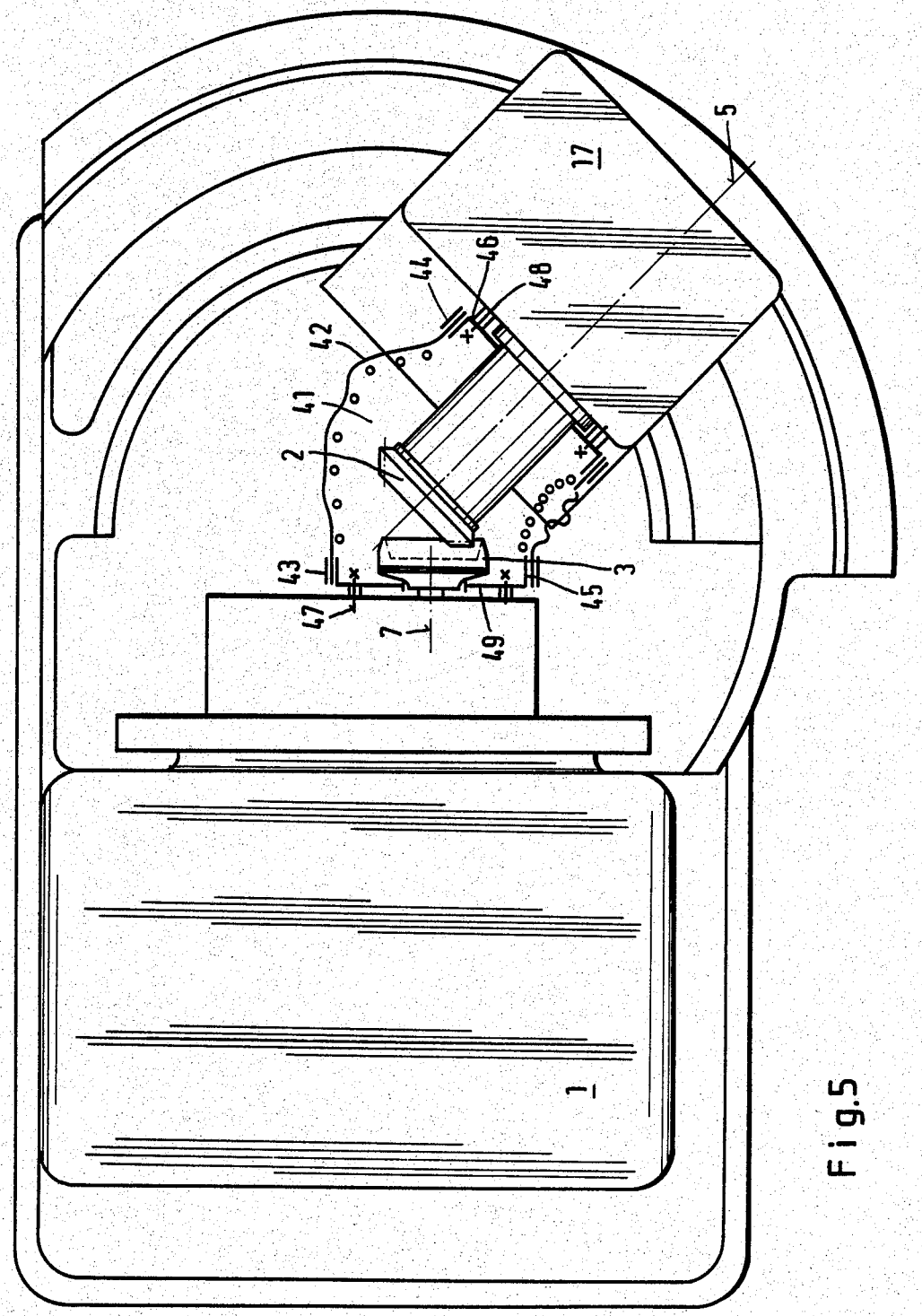
FIG. 5 is a partially sectioned plan view of the gear grinding machine in accordance with a further embodiment, also for grinding bevel gears, advantageously in accordance with the process disclosed in the German Offenlegungsschrift 2,721,164.

In the embodiment shown in FIG. 5, the parts performing the same functions are identified with the same reference numerals. In this embodiment, a cooling lubricant chamber 41 is provided, which is formed by a flexible hose which in its adjusting shape is shape-retaining, or by a bellows 42. The hose or bellows are connected at each end with a holding or supporting element 45 and 46 by a quick-lock 43 or 44, for example formed by metallic clamp straps with a toggle joint. The holding or supporting elements 45 and 46 are substantially composed of angle irons and coupled with stationary machine parts by several screws 47 or 48 distributed over a circumference.

The holding and supporting elements 45 and 46 embrace with a collar-shaped part 49 and 50 the gear 2 or the spindle which faces toward the tool 3 so as to provide their gap seals. Thereby the cooling lubricant chamber 41 which is closed outwardly in a fluid-tight manner is formed. The cooling lubricant is pumped into the chamber from below through a pump conduit, as described in the previous embodiments, whereas the cooling lubricant is continuously discharged from an upper, not shown discharge to a band filter device. The cooling lubricant flowing out through the gap seals runs into the machine sump and is pumped to the band filter device for the purpose of cleaning and/or intermediately cooling. The cooling medium chamber 41 is always filled with the cooling lubricant to such a height that at least engaging parts of the gear 2 and tool 3 work in the cooling medium bath, or in other words are located under the surface of the cooling medium.

This embodiment is also suitable, similarly to the above described embodiments, particularly for grinding bevel gears. The walls of the hose or bellows 42 follow all movements which take place during working, during adjustment or loading of the machine, or during withdrawal of the finished bevel gear 2. For inserting or withdrawing the gear 2 and/or the tool 3, the hose or bellows 42 can be opened at one or both ends. It is also possible to form the bellows 42 not closed at its upper side, or to bend it from a rectangular or square web of a suitable flexible material to a suitable tubular or hose-shape. In this case the upper discharge is replaced by a remaining slot between the web edges so that the excessive cooling lubricant can continuously discharge therethrough.

The hose or bellows can be composed of a suitable elastomeric material, particularly of a polyurethane synthetic plastic material resistant to the cooling lubricant with the consideration of the required aging, swelling and ozone strength and also with resistance not only against the cooling lubricant but also against oil and grease. The material can be provided with suitable fabric inserts or suitable reinforcements of steel or another material, for example a spring or a hinge pipe. Thereby the bellows or the hose maintains at least substantially the formed pipe shape so that the inner walls do not come into contact with movable parts of the gear 2 and the tool 3. It can be taken into account that under the action of the cooling lubricant pumped into the cooling lubricant chamber 41, the hose or the bellows 42 bulge downwardly. In all cases, however, the gear 2 and the tool 3 work in the cooling lubricant bath.

Figure 6:
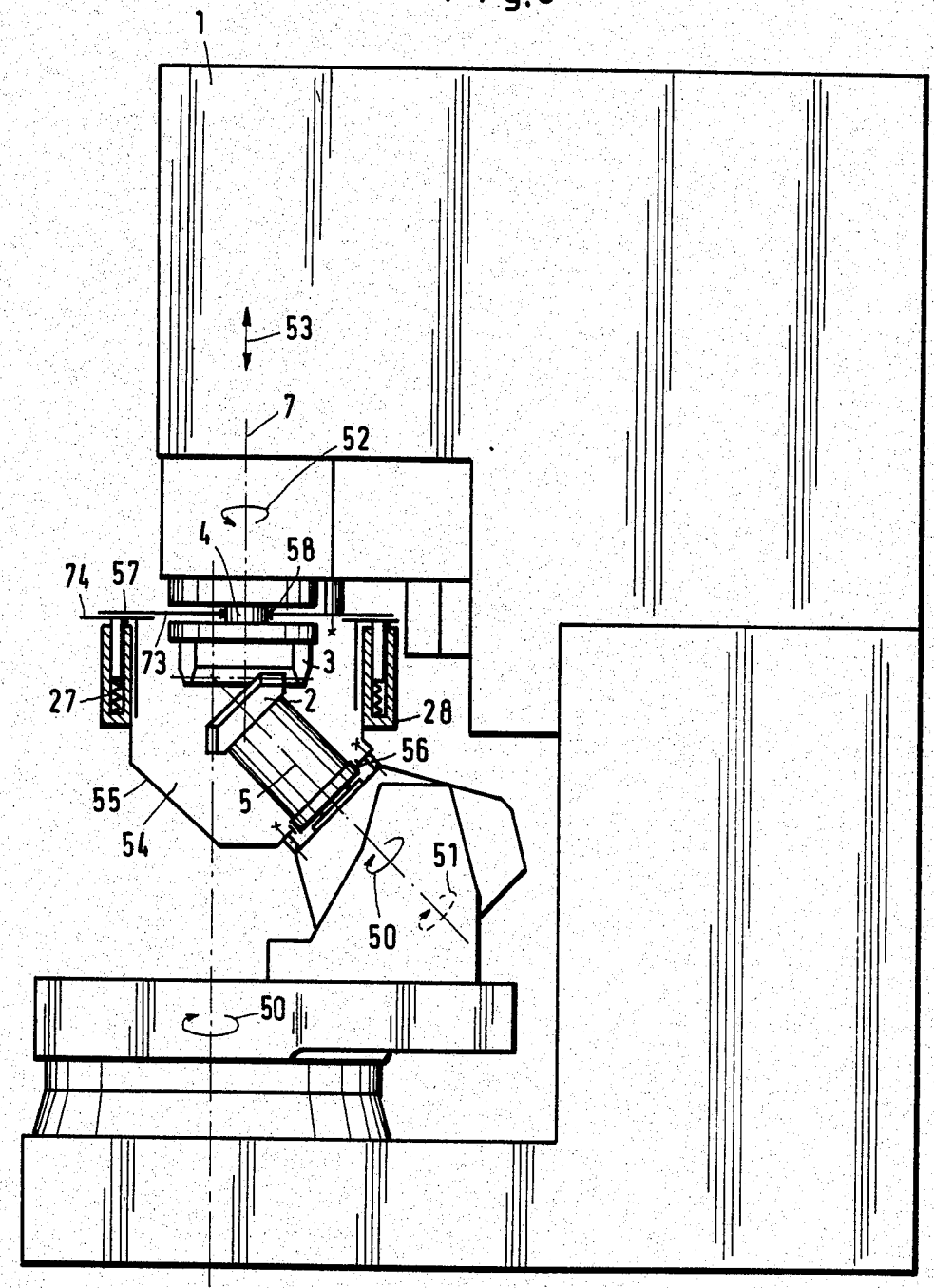
FIG. 6 is a partially sectioned side view of a further embodiment of a machine for rolling grinding with an inclined workpiece.

In the embodiment shown in FIG. 6, parts which perform the same functions are identified with the same reference numerals as in the previous embodiments. The embodiment of FIG. 6 is shown for rolling grinding of bevel gears with the inclined gear 2. The rolling movement is schematically identified by the arrow 50, and this rolling movement is carried out only on the gear 2 by superposition of two known movements. The arrow 51 identifies the part after grinding of each tooth. In contrast, the arrow 52 identifies the cutting movement of the grinding wheel 3 with additional movement. Withdrawal of the grinding wheel 3 or the setting movement is identified with the double arrow 53.

As can be seen from FIG. 6, the gear 2 and the grinding wheel 3 are again arranged in a cooling lubricant chamber 54 which is continuously supplied in its lower region in a not shown manner via a pump conduit with a cooling lubricant. Through an upper, not shown discharge, the cooling lubricant is continuously transported back to the band filter device. The cooling lubricant chamber 54 is formed by a cup-shaped container 55 which is closed at all sides and maintained filled with the cooling lubricant during the working operation at least over the grinding location. Advantageously, as in all embodiments of the invention, the bath level is located considerably above the grinding location, so that the gear 2 and the grinding wheel 3 considerably or fully dip into the cooling lubricant bath. The container 55 is filled with a filling cover 56 at least by gap seal and retained by a stationary part of the machine. For this purpose mounting screws are provided, which are not shown in the drawing. It is also possible, if necessary, to provide suitable seals which tightly seal the container 55 in this region. In the region of the spindle 4, the container is closed by a cover 57 which is releasable and can be opened. The cover 57 is sealed similarly by a gap seal 58 relative to the spindle 4. Here also other seals can be provided to retain a complete tightness.

Figure 7:
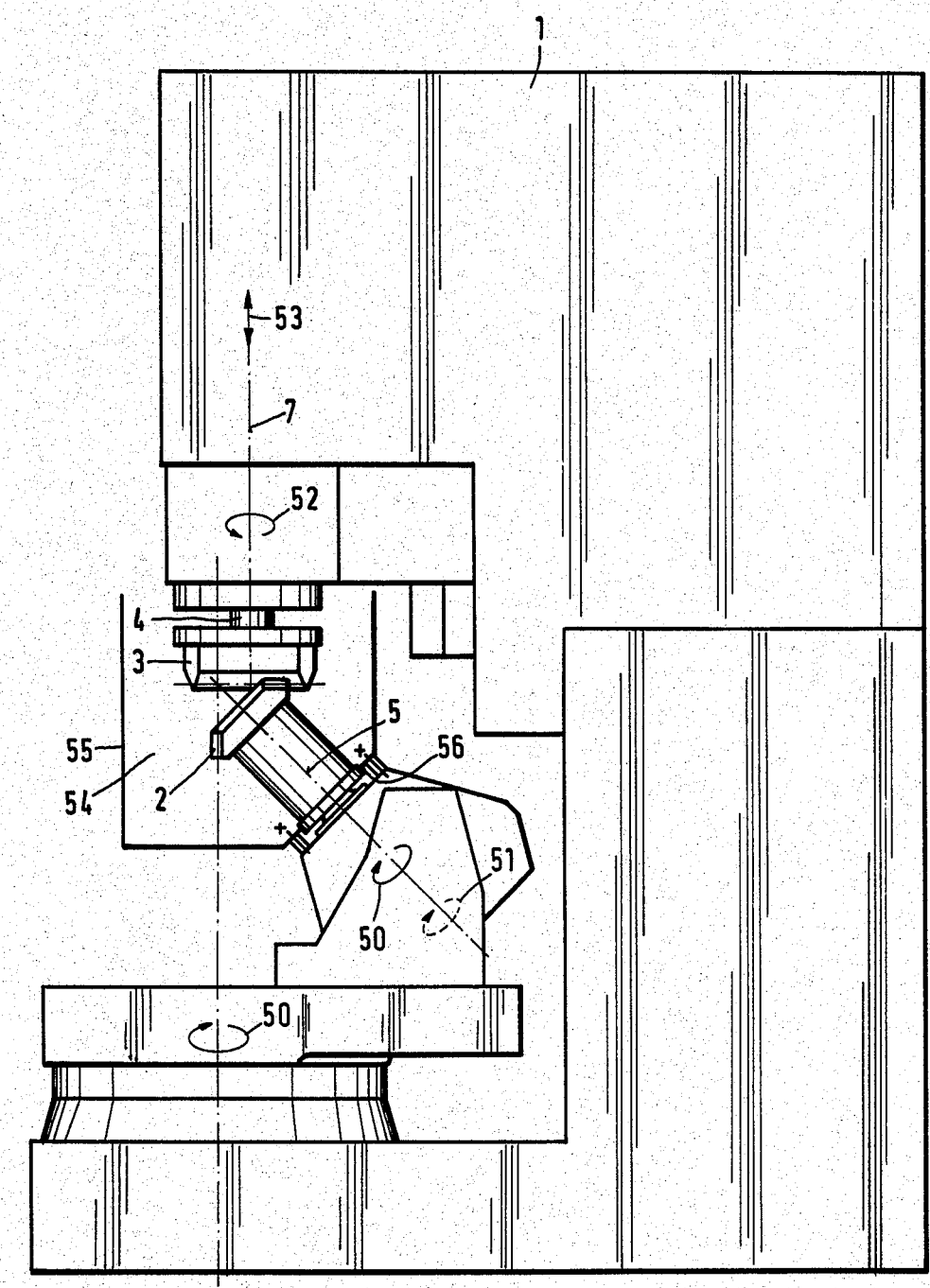
FIG. 7 is a partially sectioned side view of an embodiment which is similar to the embodiment of FIG. 6 and also used for rolling grinding of bevel gears with an inclined workpiece.

In FIG. 7, parts which perform the same functions are identified with the same reference numerals as in the embodiment of FIG. 6. This embodiment differs from the embodiment of FIG. 6 in the fact that the cup-shape container 55 has no cover and is open upwardly. The container 55 can be supplied with the pumped cooling lubricant in such a manner that it continuously flows over upwardly. The flowing out cooling lubricant runs into the machine sump and is pumped there to the filter device.

Figure 8:
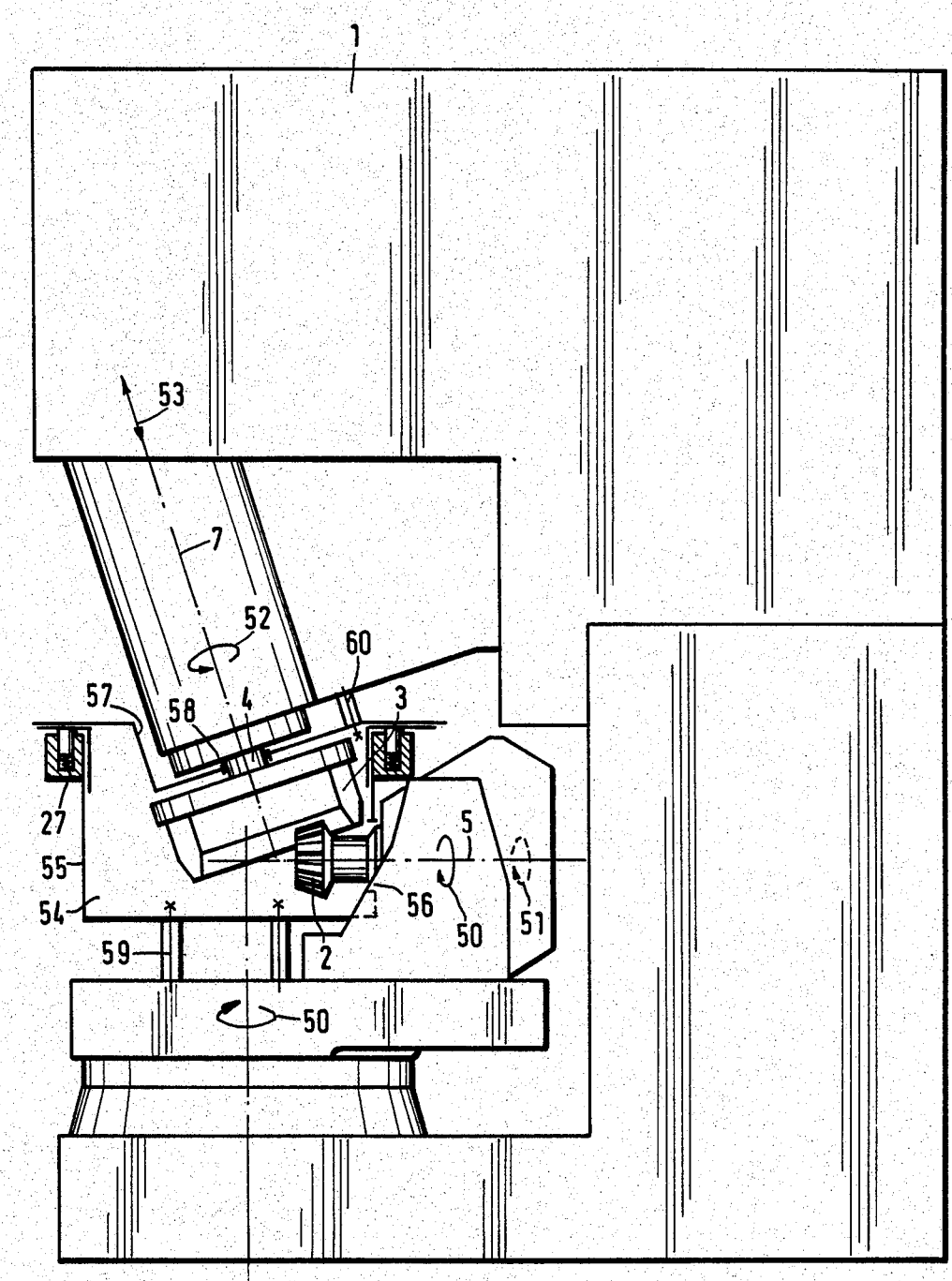
FIG. 8 is a partially sectioned view of the gear grinding machine in accordance with still a further embodiment, particularly for rolling grinding with an inclined grinding head, also called "Tilt" process for pinions.

In the embodiment shown in FIG. 8, the parts which perform the same functions are identified with the same reference numerals as in the previous embodiment. In this embodiment, rolling grinding with inclined grinding head takes place, which is identified as "Tilt" method and used for grinding of pinions. The respective bevel gear is produced by immersion grinding. The cup-shaped container 55 is closed by the cover 57. The supply and withdrawal of the cooling lubricant takes place as in the embodiment of FIG. 6. The container 55 is releasably arranged on a bearing 59.

Figure 9:
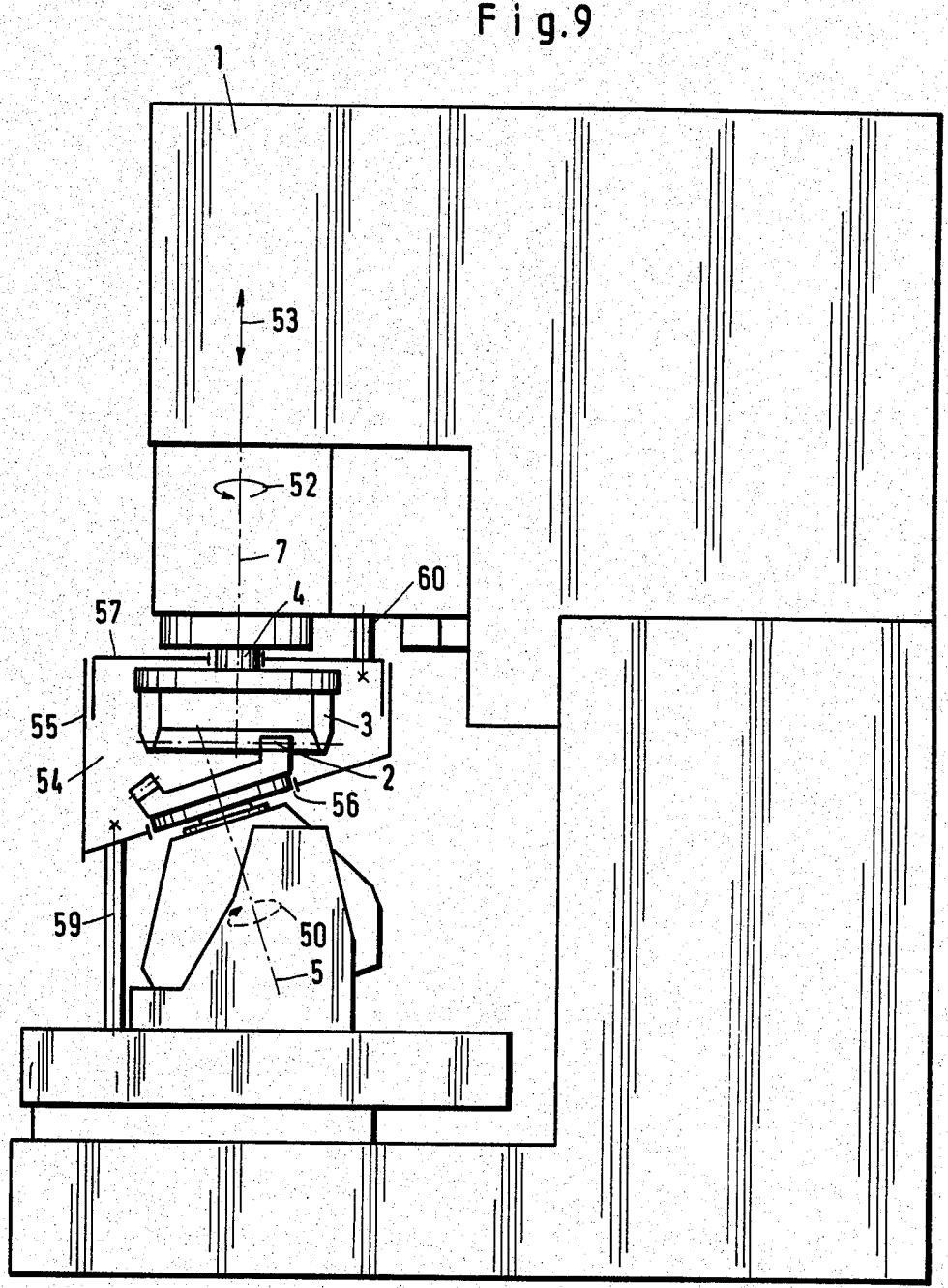
FIG. 9 is a partially sectioned side view of the gear grinding machine in accordance with an embodiment for immersion grinding (shape grinding) without rolling, for cup-shaped gears.

In the embodiment shown in FIG. 9, parts which perform the same function are identified with the same reference numerals as in the previous embodiments. Here, the immersion grinding (shape grinding) of bevel gears takes place without rolling. The pinions must be produced in this case by the "Tilt" process. The container 55 is closed by the cover 57. The supply and withdrawal of the cooling lubricant is performed in a manner which is described in connection with the embodiment of FIG. 6. In addition to a supporting device 59, in the embodiment of FIG. 8 a holding device 60 formed as a screw is provided so as to support the cover 57 in a cant-free manner.

Figure 10:
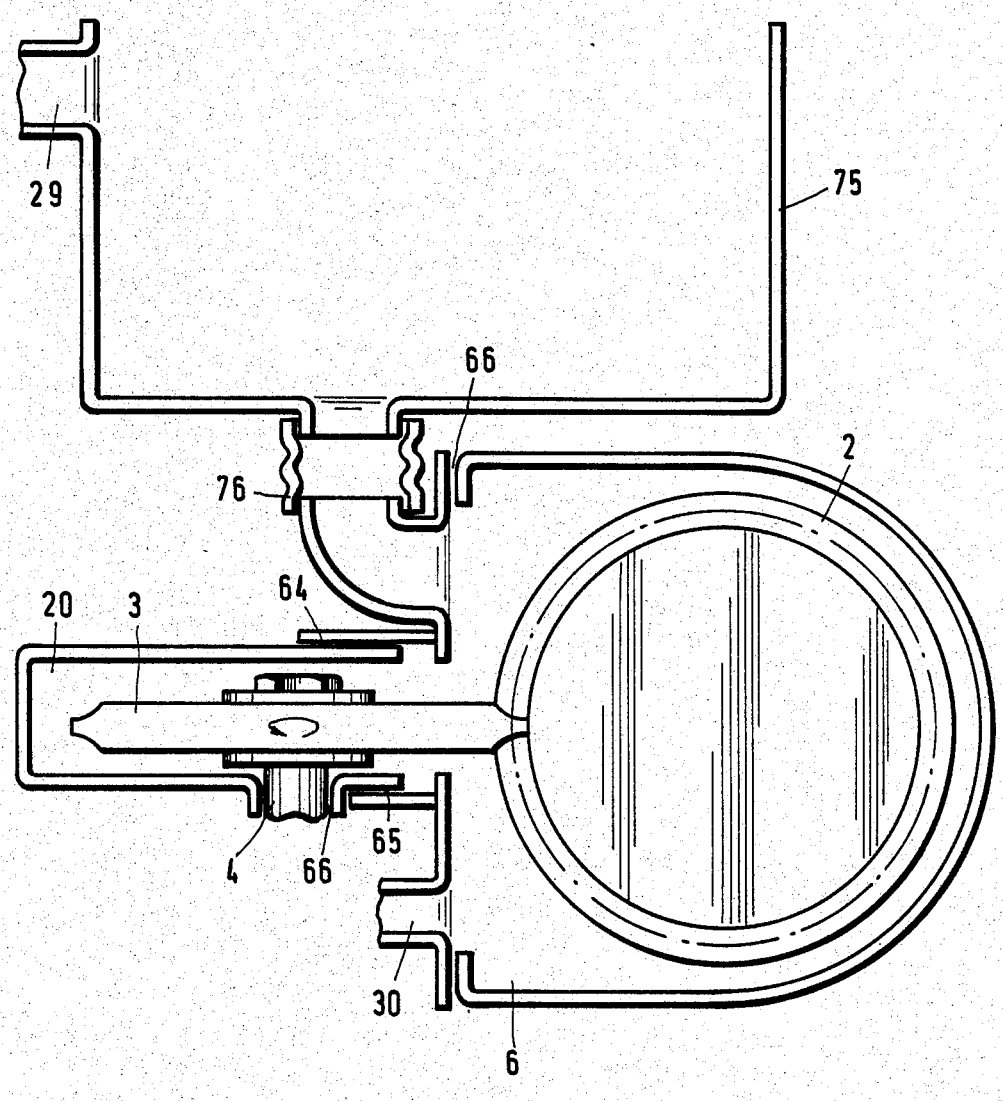
FIG. 10 is a partially sectioned elevation of a further embodiment for shape grinding of cylindrical gears.

The embodiment of FIG. 10 deals with an arrangement for shape grinding of cylindrical gears. Here again, parts which perform the same functions are identified with the same reference numerals as in the previous embodiments. The gear 2 is supported on the shaft 5 in the cooling lubricant chamber 6. Coaxially and at a distance from the gear 2, a suitable dressing tool 61 is arranged. The shaft 5 is sealed outwardly at its two ends from the cooling lubricant chamber 6 in a substantially fluid-tight manner by gap seals 62 and 63. It is of course to be understood that this is not absolutely necessary, since similarly to the other embodiments a certain quantity of the cooling lubricant can flow out. At the gap seals 64, 65 and 66 a certain leakage loss can be taken into account which, however, must be lower than the quantity of cooling lubricant supplied by a not shown pump conduit. The cooling lubricant discharges advantageously in the upper region or is transported back to be cleaned in a filter device.

Figure 11:
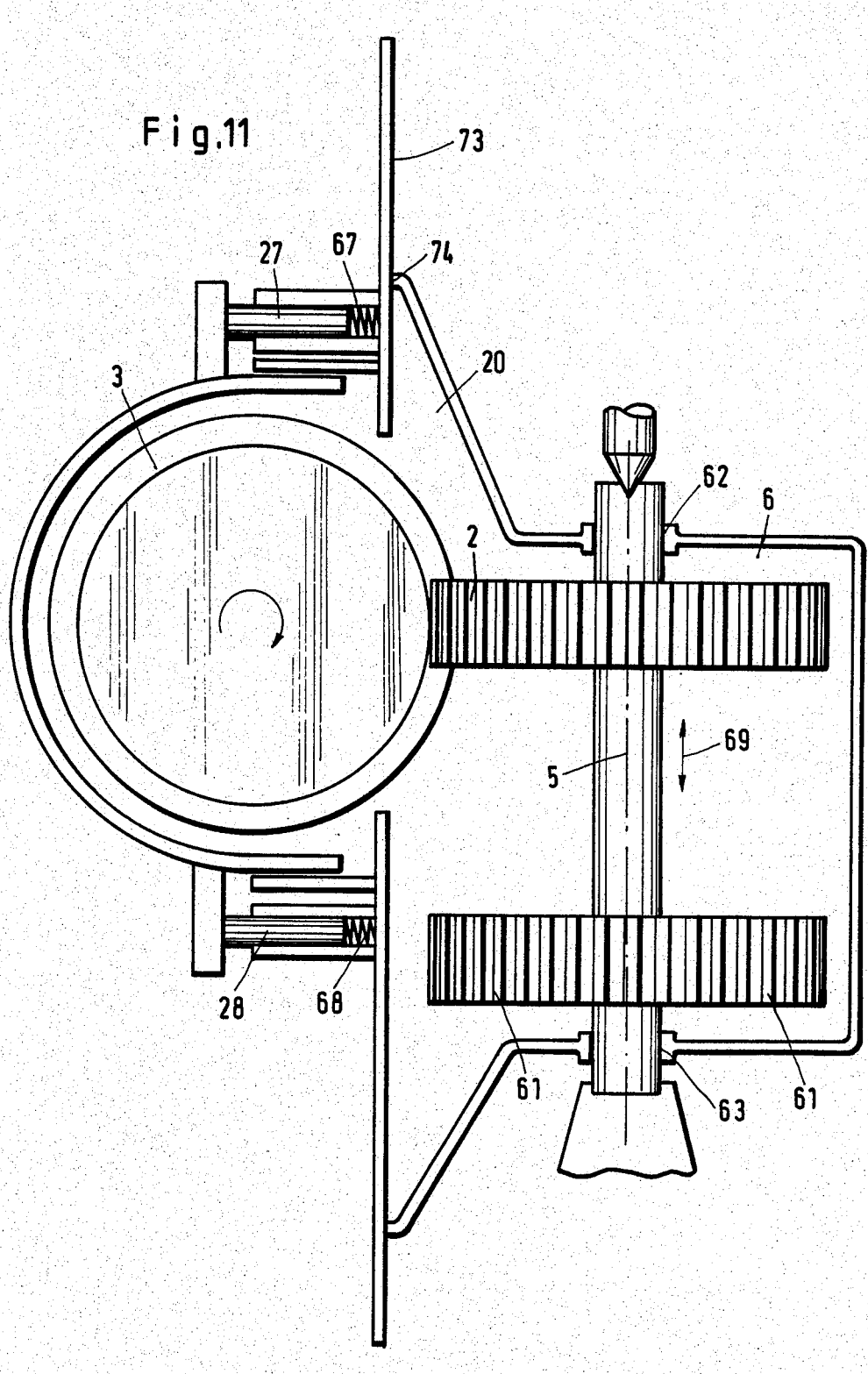
FIG. 11 is a partially sectioned plan view of FIG. 10.
Figure 12:
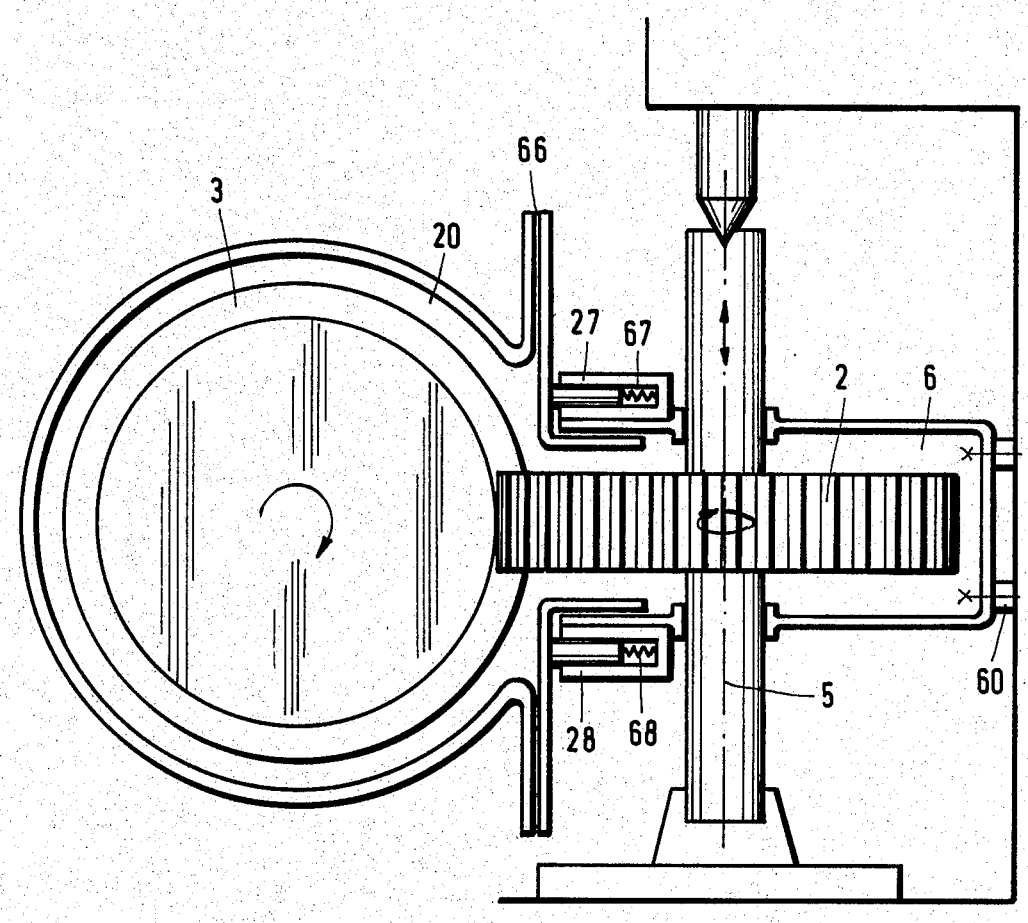
FIG. 12 is a partially sectioned elevation of the gear grinding machine in accordance with an embodiment for continuous rolling grinding of spur gears (cylindrical gears) in accordance with so-called Reishauser process.

It is advisable, however, to provide at the location 56 a gap seal. Changes of the axial play can be compensated here by adjusting pistons 27 and 28 which can be displaced by springs 67 and 68 as schematically shown in FIG. 11. In this case, the cooling lubricant chamber 6, 20 is also maintained filled with oil during the grinding process, at least to such an extent that the grinding location is located under the cooling lubricant level in the cooling lubricant bath. The double arrow 69 identifies different feeding directions.

Figure 13:
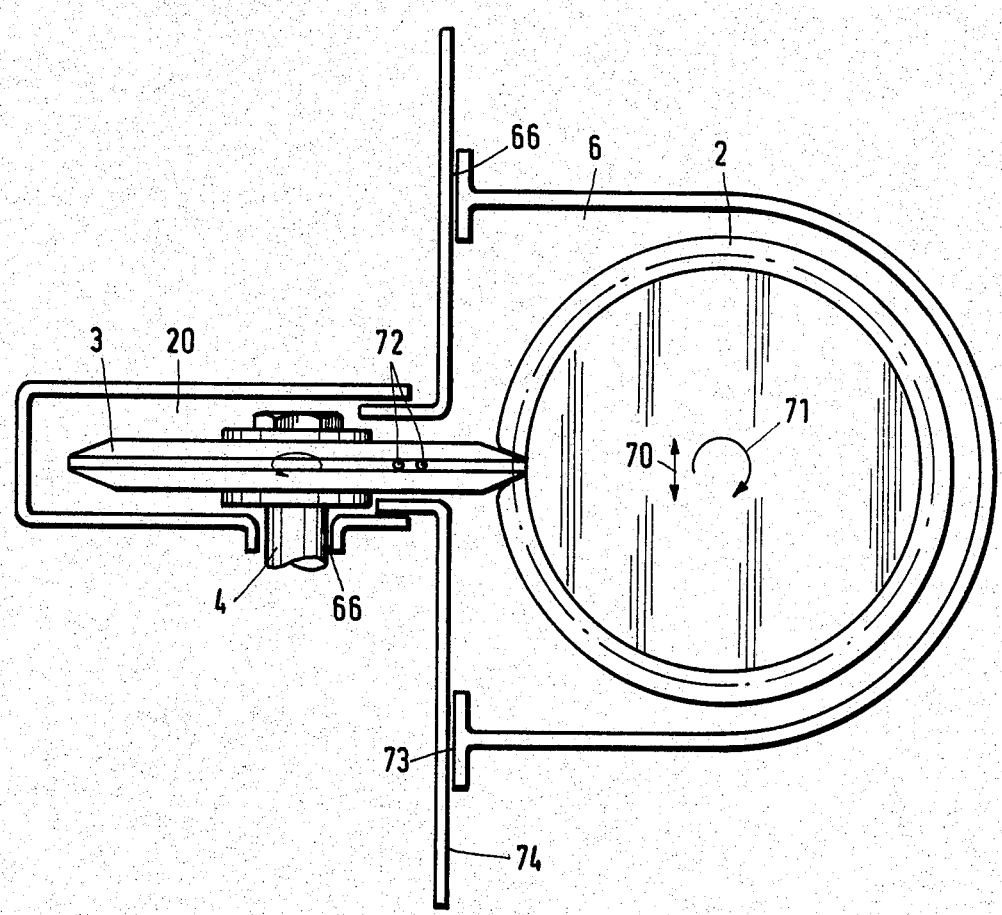
FIG. 13 is a partially sectioned elevation of the gear grinding machine in accordance with an embodiment for performing the Niles/Höfler process (partial rolling grinding of spur gear/cylindrical gears)
Figure 14:
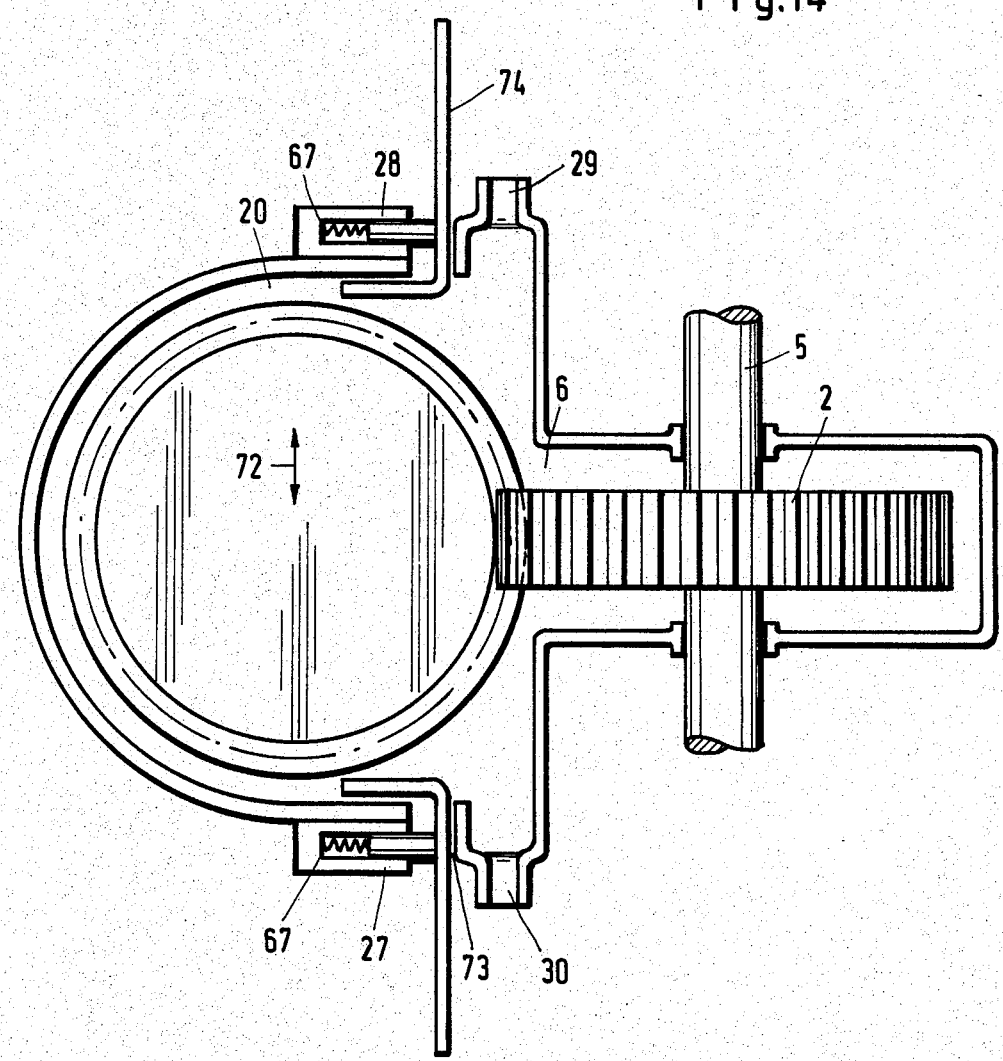
FIG. 14 is a partially sectioned plan view of FIG. 13.

The embodiment of FIG. 13 shows a machine suitable for the Niles-Höfler process which makes possible working of spur gears (cylindrical gears) by partial rolling grinding. Here also, parts which perform the same functions are identified by the same reference numerals as in the previous embodiments. The rolling movement is identified by the double arrow 70 and the arrow 71, whereas the grinding tool feed is identified by two reference points 72. Here also, the chamber 6, 20 is filled with the cooling lubricant so that the grinding location is under the upper level surface of the bath. All seals here have to be gap seals. Similarly to the other embodiments, also other suitable sealing elements can be used here, so as to provide a complete closure.

In the embodiments of FIGS. 10, 11 or 13, 14, it should be noted that, in these cases, a high oscillation speed in the range of 500 mm/sec between the gear and the grinding tool takes place. The advantage of the shown embodiments is that they can work with very small quantities of oil, so that no additional loading of the drive by acceleration of the oil masses takes place.

The advantage of the operation with gap seals during grinding of bevel gears is that no friction takes place which otherwise generates additional heat, and during grinding with additional movement of the grinding wheel the oscillation movement need not be absorbed via a grinding seal.

The advantage of all shown embodiments is that the sealing (with gap seal or grinding seal) is performed in such a manner that neither the seal of the grinding spindle nor the seal of the workpiece spindle in the machine is loaded by the grinding oil volumes.

It will be understood that each of the elements described above, or two or more together, may also find a useful application in other types of constructions differing from the types described above.

While the invention has been illustrated and described as embodied in an arrangement for grinding gears, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for grinding teeth of gears in a grinding machine, comprising means containing a bath of a cooling lubricant arranged so that grinding is constantly performed in said cooling lubricant bath under the level of the cooling lubricant, said means include a cooling a lubricant chamber which accommodates the bath and is arranged so that at least a circumferential part of a grinding tool in contact with a tooth to be worked and at least the tooth to be worked are located in said chamber, said chamber being adjustable so as to allow all working movements of the gear and the grinding tool and also insertion and withdrawal of the gear and the grinding tool, said cooling lubricant chamber being formed as a container including at least two tubular housing parts which are movable and arrestable, and also sealed relative to one another by gap seals, the gear to be worked having a gear spindle rotatable about a gear axis and the grinding tool having a tool spindle rotatable about a tool axis, said housing parts including an arcuately curved wall part, a turntable pipe turnable inside said wall part about an axis normal to said tool axis coaxially with said gear axis and having a collar-shaped projection which forms together with said wall part a gap seal, a telescopable pipe having one end longitudinally movable in said turntable pipe via a gap seal, a guiding pipe extending coaxially to said gear axis and arranged so that another end of said telescopable pipe is located in said guiding pipe with interposition of a gap seal, and said guiding pipe having a flange releasably connected with a stationary machine part.

2. An arrangement as defined in claim 1, wherein said housing parts further include an annular disc extending normal to the tool spindle and provided with a bearing for the axis of turning of said turnable pipe and a central opening through which the gear and the tool can be brought into contact with one another, a bearing pipe arranged to surround the tool with a relatively great radial distance, and an end cover closing said bearing pipe in the region of a rear side of the tool and in the region of the tool spindle and sealed by a gap seal relative to the latter.

3. In a gear-tooth grinding machine having a grinding tool and a cooling device for performing the grinding in a bath of a cooling lubricant, said cooling device comprising a chamber surrounding at least a zone of contact of a workpiece and the grinding tool and containing the cooling lubricant bath, and means for adjusting the position and/or volume of the chamber relative to the said zone of contact so as to permit the exchange of the grinding tool and/or workpiece and, during the grinding operation, to keep the zone of contact continuously immersed in the cooling lubricant bath, said cooling lubricant chamber being assembled of a first container assigned to the grinding tool and a second container assigned to the workpiece, the two containers being sealingly insertable one into the other, wherein the grinding tool rotates about a center axis, the second container having an arcuate wall and a hinge mount arranged opposite an inner surface of the arcuate wall, and the second container being hinged on the hinge mount and in sliding contact with the inner surface of the arcuate wall.

4. A cooling device as defined in claim 3 wherein at least one of the two containers is assembled of two housing parts, said parts being telescopically insertable one into the other.

* * * * *